No. 735,728.

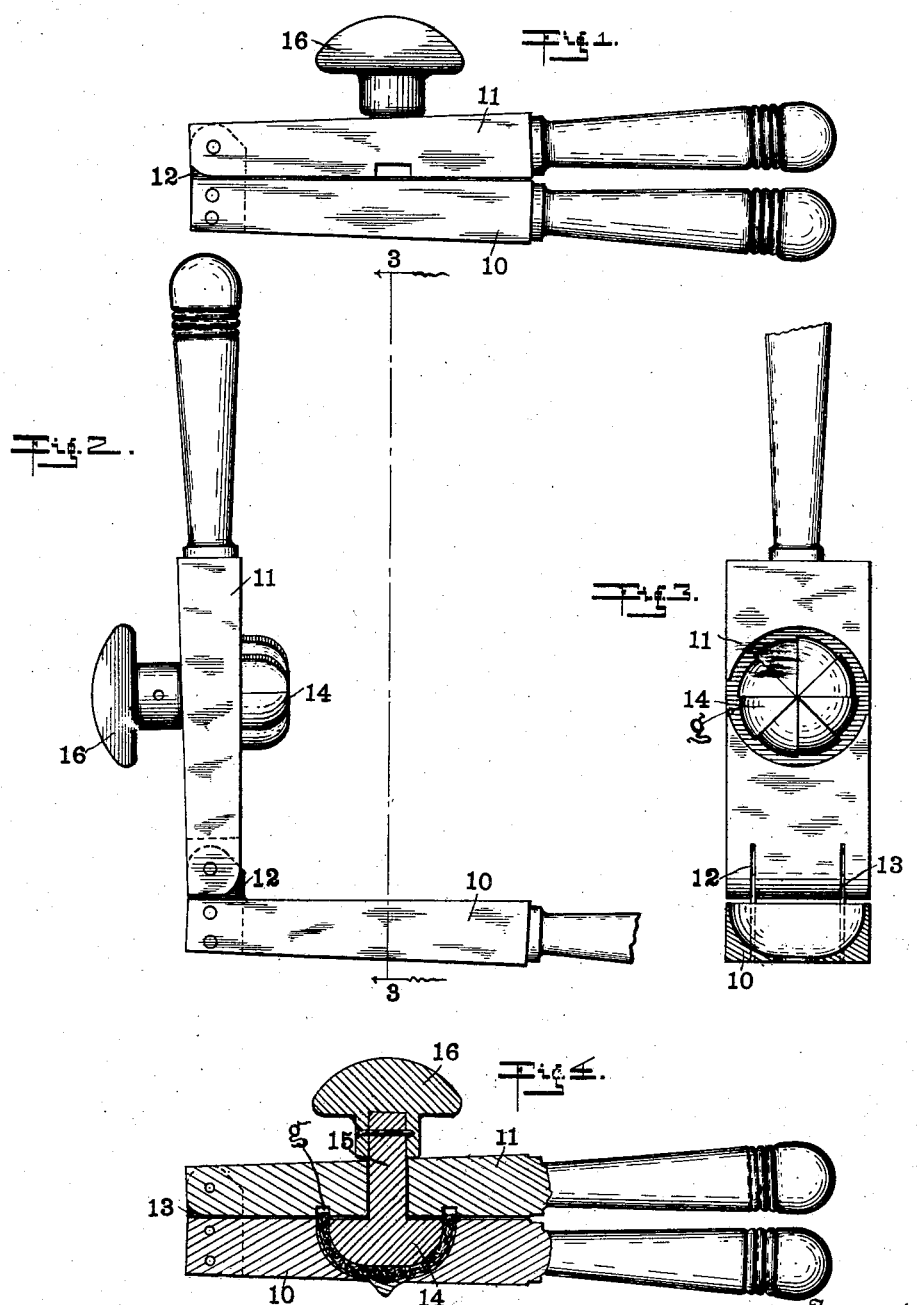

Patented August 11, 1903.

UNITED STATES PATENT OFFICE.

ROBERT L. DORSEY, OF INDIANAPOLIS, INDIANA, ASSIGNOR TO TUCKER & DORSEY MANUFACTURING COMPANY, OF INDIANAPOLIS, INDIANA, A CORPORATION OF INDIANA.

LEMON-SQUEEZER.

SPECIFICATION forming part of Letters Patent No. 735,728, dated August 11, 1903.

Application filed June 20, 1902. Serial No. 112,444. (No model.)

*To all whom it may concern:*

Be it known that I, ROBERT L. DORSEY, a citizen of the United States, residing at Indianapolis, in the county of Marion and State of Indiana, have invented certain new and useful Improvements in Lemon-Squeezers, of which the following is a specification.

The object of my present invention is to produce a simple and inexpensive lemon-squeezer, principally for ordinary household use, which shall be capable of completely removing the pulp from the fruit as well as of expelling the juice.

Referring to the accompanying drawings, which are made a part hereof and on which similar reference characters indicate similar parts, Figure 1 is a side elevation of a lemon-squeezer closed embodying my said invention; Fig. 2, a similar view open; Fig. 3, a view of the face of one of the halves as seen when looking toward it from the dotted line 3 3 in Fig. 2, and Fig. 4 a longitudinal vertical sectional view of such a squeezer when the halves are closed together the same as in Fig. 1.

My improved lemon-squeezer consists, as is common, of two halves 10 and 11, preferably formed from wood and united by hinges 12 and 13. The part 10 is substantially of a common form, containing merely a cup-shaped opening to receive the outer or convex side of the portion of fruit to be operated upon, there being an opening in the bottom of the said cup extending through to the outside, through which the nipple of the lemon will extend in use. The other part, 11, has an annular groove $g$ extending around the bottom of the projecting part, which in operation enters the inside of the half-lemon, (or other fruit,) said groove being adapted to receive and discharge the juice. The projecting portion 14 instead of being formed integrally or fixed in place, as is common, is in the form of a corrugated grinder, the serrations, as shown, preferably extending radially from the center over its surface and down until the surface of the squeezer-half 11 is reached. The stem 15 of this part extends through a hole in the squeezer-half 11 and is provided with a handle 16 upon the outside.

The operation is as follows: The lemon (or other fruit) is cut in halves, as is usual, and a half placed in the squeezer and the parts brought together. Then as the parts are thus held the male die is revolved by means of its handle 16, which grinds out the pulp from the interior of the fruit-rind, the result being that when the fruit is removed from the squeezer the pulp as well as the juice have been removed from said rind, so that the whole can be utilized. The opening in the bottom of the cavity which receives the fruit is important to the operation of this device, as it serves to afford a secure grip on the fruit during the pulp-grinding part of the operation.

Having thus fully described my said invention, what I claim as new, and desire to secure by Letters Patent, is—

1. The combination, in a lemon-squeezer, of two halves hinged together, one having a matrix-cavity or female die formed therein, and the other having an annular groove of a size corresponding to the periphery of said cavity or matrix, and a separate revoluble male die mounted in a bearing in said part and adapted to enter the female die, said revoluble die being provided with a handle whereby it may be turned when the two parts of the implement have been placed together, substantially as and for the purposes set forth.

2. The combination, in a lemon-squeezer, of two parts hinged together, one having a cavity to receive the fruit to be operated upon, said cavity having a hole through the bottom adapted to receive the nipple of the fruit, and a revoluble projecting die part carried by the other member and having a ridged surface, whereby, when it is turned, the pulp is ground out of the rind of the fruit being operated upon, substantially as set forth.

3. The combination, in a lemon-squeezer, of two parts hinged together, one having a matrix-cavity or female die to receive the fruit to be operated upon, said cavity having a hole through the bottom adapted to receive the nipple of the fruit, and the other having an annular groove of a size corresponding to the periphery of said cavity or matrix, and a separate revoluble male die mounted in a bearing in said part and adapted to enter the female die, said several parts being constructed, arranged and operating substantially as shown and described.

In witness whereof I have hereunto set my hand and seal, at Indianapolis, Indiana, this 13th day of June, A. D. 1902.

ROBERT L. DORSEY. [L. S.]

Witnesses:
ARTHUR M. HOOD,
JAMES A. WALSH.